(12) United States Patent
Bellifemine

(10) Patent No.: US 11,022,496 B2
(45) Date of Patent: Jun. 1, 2021

(54) INFRARED THERMOMETER

(71) Applicant: TECNIMED S.r.l., Vedano Olona (IT)

(72) Inventor: Francesco Bellifemine, Varese (IT)

(73) Assignee: TECNIMED S.R.L., Vedano Olona (IT)

( * ) Notice: Subject to any disclaimer, the term of this patent is extended or adjusted under 35 U.S.C. 154(b) by 229 days.

(21) Appl. No.: 16/024,219

(22) Filed: Jun. 29, 2018

(65) Prior Publication Data

US 2020/0003623 A1 Jan. 2, 2020

(51) Int. Cl.
*G01J 5/00* (2006.01)
*G01J 5/02* (2006.01)
*G01J 5/04* (2006.01)
*G01J 5/08* (2006.01)

(52) U.S. Cl.
CPC .............. *G01J 5/0265* (2013.01); *G01J 5/04* (2013.01); *G01J 5/0818* (2013.01)

(58) Field of Classification Search
CPC combination set(s) only.
See application file for complete search history.

(56) References Cited

U.S. PATENT DOCUMENTS

| | | |
|---|---|---|
| 3,535,016 A | 10/1970 | Malifaud |
| 3,581,570 A | 6/1971 | Wortz |
| 4,121,574 A | 10/1978 | Lester |
| 4,315,150 A | 2/1982 | Darringer et al. |
| 4,596,050 A | 6/1986 | Rogers |
| 4,636,091 A | 1/1987 | Pompei et al. |
| 4,743,122 A | 5/1988 | Yamano et al. |
| 4,773,766 A | 9/1988 | Nagasaka et al. |
| 4,854,730 A | 8/1989 | Fraden |
| 4,868,791 A | 9/1989 | Cathignol et al. |
| 4,910,717 A | 3/1990 | Terry |
| 5,012,813 A | 5/1991 | Pompei et al. |
| 5,017,018 A | 5/1991 | Iuchi et al. |
| 5,115,815 A | 5/1992 | Hansen |
| 5,172,978 A | 12/1992 | Nomura et al. |
| 5,199,436 A | 4/1993 | Pompei et al. |
| 5,339,380 A | 8/1994 | Wysocki et al. |
| 5,352,039 A * | 10/1994 | Barral ............. G01J 5/02 374/121 |
| 5,388,907 A | 2/1995 | Aoyama et al. |
| 5,439,442 A | 8/1995 | Bellifemine |
| 5,626,424 A | 5/1997 | Litvin et al. |
| 5,639,162 A | 6/1997 | Sai |
| 5,653,238 A | 8/1997 | Pompei |

(Continued)

FOREIGN PATENT DOCUMENTS

| | | | |
|---|---|---|---|
| CH | 662438 A5 | 9/1987 | |
| DE | 19528590 A1 | 2/1997 | |

(Continued)

*Primary Examiner* — Lisa M Caputo
*Assistant Examiner* — Nasir U. Ahmed
(74) *Attorney, Agent, or Firm* — Underwood & Associates, LLC

(57) ABSTRACT

The present invention relates to an infrared thermometer (1) able to project the detected temperature directly on the surface (6a) of the body (2) to be measured. The determination of the ideal distance of the thermometer from the body, necessary for the correct detection of the temperature thereof, being visually identifiable by means of the relative position of luminous shapes (8a, 8b) projected on the body to be measured (6).

20 Claims, 5 Drawing Sheets

(56) References Cited

U.S. PATENT DOCUMENTS

| | | |
|---|---|---|
| 5,740,809 A | 4/1998 | Baratta |
| 5,800,386 A | 9/1998 | Bellifemine |
| 5,800,504 A | 9/1998 | Bellifemine |
| 5,820,264 A | 10/1998 | Tsao et al. |
| 5,823,678 A | 10/1998 | Hollander et al. |
| 5,839,829 A | 11/1998 | Litvin et al. |
| 5,848,842 A | 12/1998 | Peuse et al. |
| 5,860,741 A | 1/1999 | Tsao et al. |
| 5,874,736 A | 2/1999 | Pompei |
| 6,019,507 A | 2/2000 | Takaki |
| 6,045,257 A | 4/2000 | Pompei et al. |
| 6,047,205 A | 4/2000 | Pompei |
| 6,056,435 A | 5/2000 | Pompei |
| 6,109,782 A | 8/2000 | Fukura et al. |
| 6,179,785 B1 | 1/2001 | Martinosky et al. |
| 6,196,714 B1 | 3/2001 | Bellifemine et al. |
| 6,234,669 B1 | 5/2001 | Kienitz et al. |
| 6,290,389 B2 | 9/2001 | Schmidt et al. |
| 6,292,685 B1 * | 9/2001 | Pompei ................ A61B 5/015 374/100 |
| 6,299,347 B1 | 10/2001 | Pompei |
| 6,319,206 B1 | 11/2001 | Pompei et al. |
| 6,377,400 B1 * | 4/2002 | Hollander ............. G01J 5/02 359/618 |
| 6,435,711 B1 | 8/2002 | Gerlitz |
| 6,439,768 B1 | 8/2002 | Wu et al. |
| 6,499,877 B2 | 12/2002 | Pompei |
| 6,527,439 B1 | 3/2003 | Bellifemine |
| 6,543,933 B2 | 4/2003 | Stergiopoulos et al. |
| 6,742,927 B2 | 6/2004 | Bellifemine |
| 7,001,066 B1 | 2/2006 | Bellifemine |
| 7,048,437 B2 | 5/2006 | Bellifernine |
| 7,314,309 B2 | 1/2008 | Pompei |
| 7,336,987 B2 | 2/2008 | Laurence et al. |
| 7,357,570 B2 | 4/2008 | Schuele |
| 7,364,356 B2 | 4/2008 | Dicks et al. |
| 7,410,291 B2 | 8/2008 | Koch |
| 7,651,266 B2 | 1/2010 | Bellifemine |
| 8,128,280 B2 | 3/2012 | Bellifemine |
| 8,821,010 B2 | 9/2014 | Bellifemine |
| 2002/0061048 A1 * | 5/2002 | Schmidt ................ G01J 5/08 374/121 |
| 2002/0123690 A1 | 9/2002 | Fraden |
| 2002/0181539 A1 | 12/2002 | Sato et al. |
| 2002/0186746 A1 | 12/2002 | Curello |
| 2003/0016728 A1 | 1/2003 | Gerlitz |
| 2003/0099277 A1 * | 5/2003 | Bellifemine ............ G01J 5/089 374/121 |
| 2004/0076217 A1 | 4/2004 | Lin |
| 2004/0125854 A1 | 7/2004 | Liu et al. |
| 2004/0254472 A1 | 12/2004 | McQuilkin |
| 2005/0185695 A1 | 8/2005 | Hollander et al. |
| 2005/0207470 A1 | 9/2005 | Bennett et al. |
| 2005/0271117 A1 | 12/2005 | Grassl et al. |
| 2007/0016074 A1 | 1/2007 | Abreu |
| 2008/0187022 A1 | 8/2008 | Bellifemine |
| 2008/0194983 A1 | 8/2008 | Laurence et al. |
| 2008/0200830 A1 | 8/2008 | Pompei |
| 2008/0262782 A1 | 10/2008 | Pompei et al. |
| 2010/0091813 A1 | 4/2010 | Bellifemine |
| 2010/0113894 A1 | 5/2010 | Padiy |
| 2010/0274154 A1 | 10/2010 | Bellifemine |
| 2013/0215928 A1 * | 8/2013 | Bellifemine ............ A61B 5/01 374/121 |
| 2013/0230074 A1 * | 9/2013 | Shin ........................ G01K 1/20 374/129 |

FOREIGN PATENT DOCUMENTS

| | | |
|---|---|---|
| DE | 29912619 U1 | 1/2000 |
| DE | 102004027443 B3 | 7/2005 |
| EP | 0411121 A1 | 2/1991 |
| GB | 2291498 A | 1/1996 |
| JP | S59194512 A | 11/1984 |
| JP | H0195245 A | 4/1989 |
| JP | 6074626 B2 | 2/2017 |
| WO | 1992002792 A1 | 2/1992 |
| WO | 1994020023 A1 | 9/1994 |
| WO | 1998001730 A1 | 1/1998 |
| WO | 1999039166 A1 | 5/1999 |
| WO | 2000016046 A2 | 3/2000 |
| WO | 2007054821 A2 | 5/2007 |

* cited by examiner

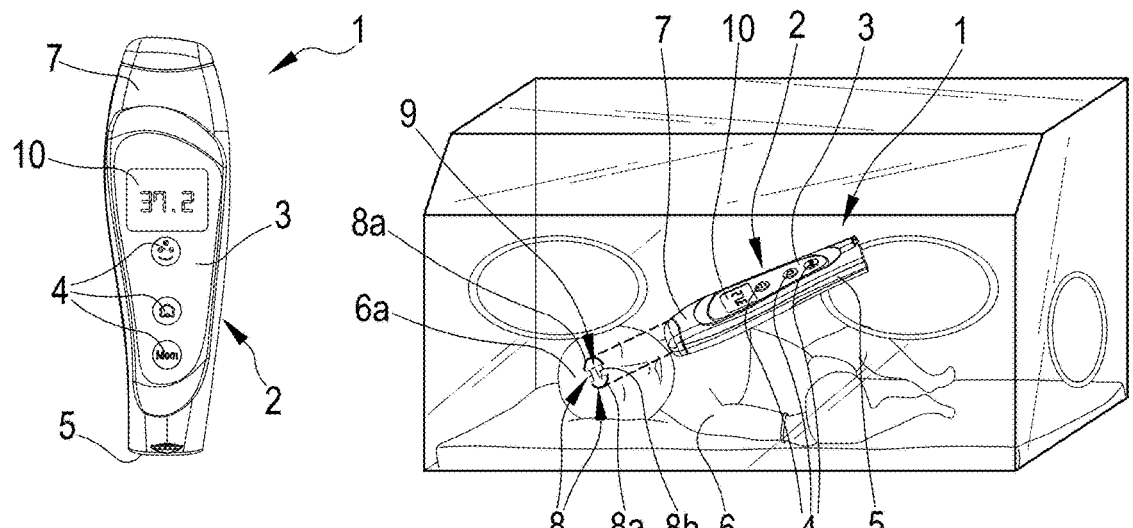
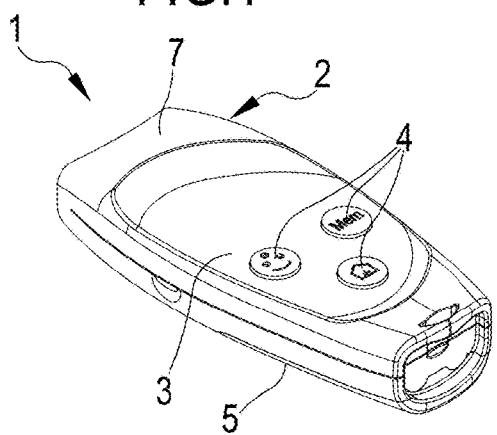
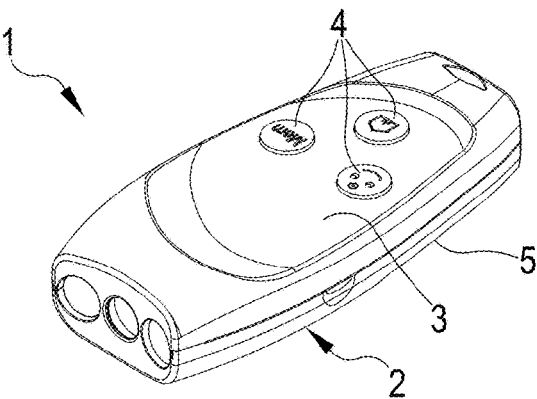
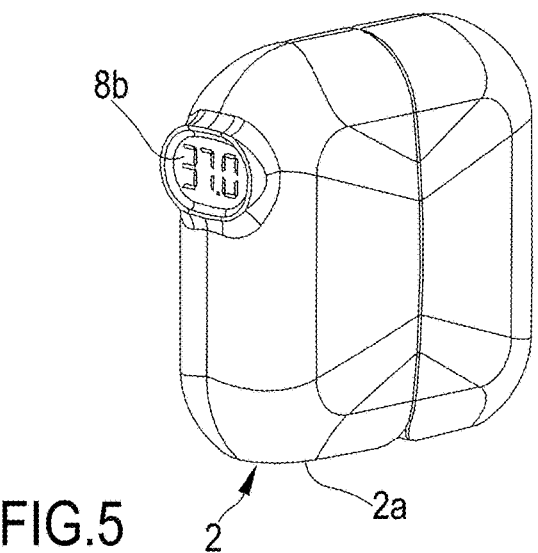
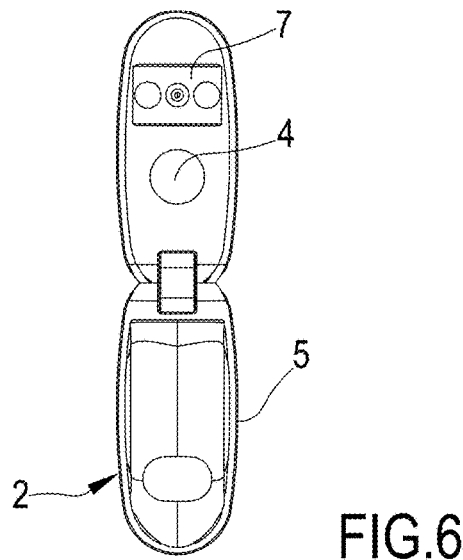
FIG.1  FIG.2  FIG.3  FIG.4  FIG.5  FIG.6

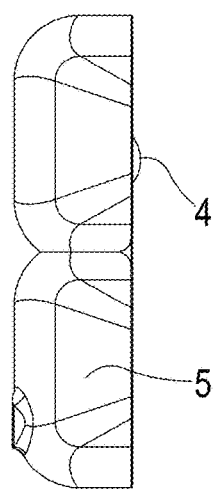
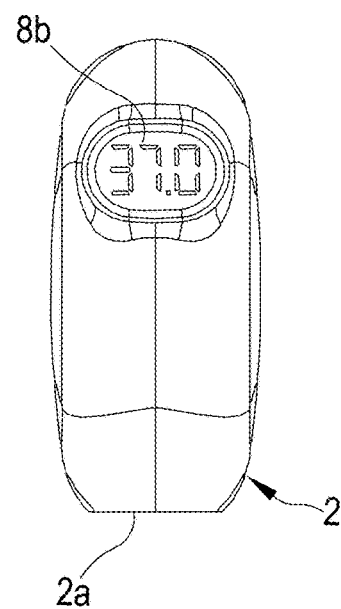
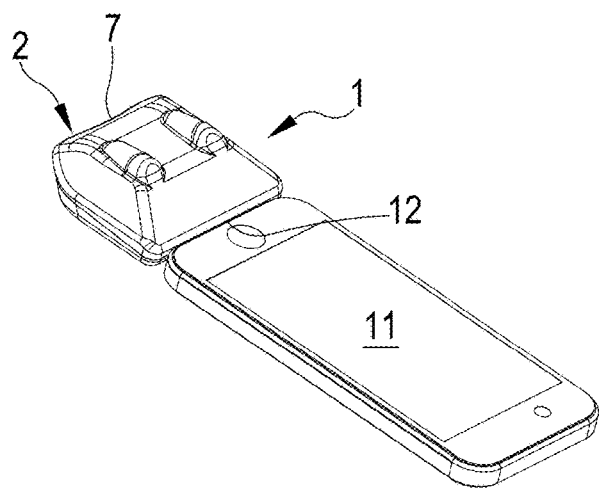
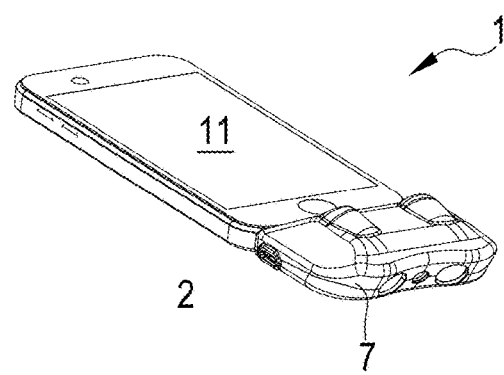
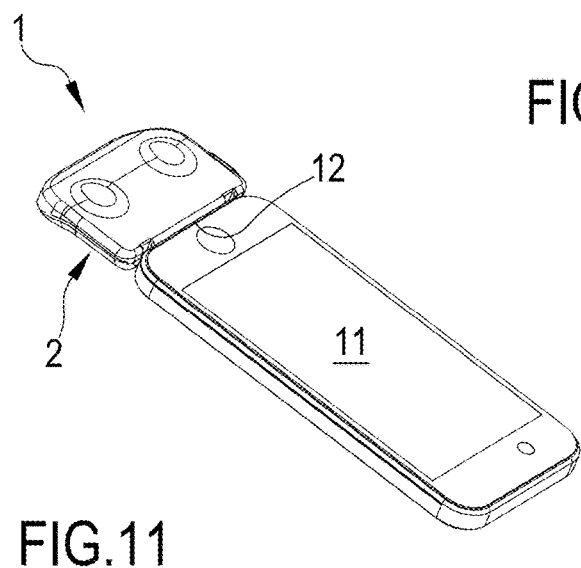
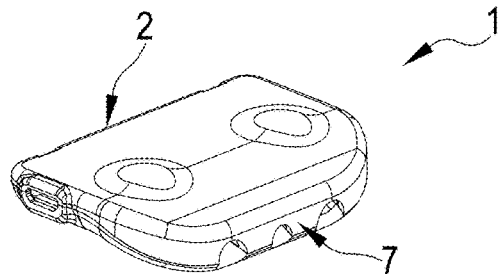
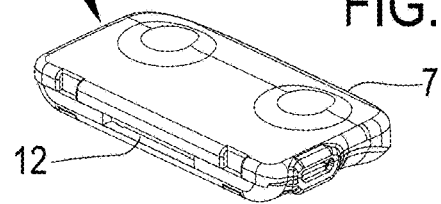

INFRARED THERMOMETER

FIELD OF THE INVENTION

The present invention relates to an infrared thermometer. The object of the present invention is among the thermometers that allow the detection of the temperature of a body without necessarily coming into contact therewith. In particular, the thermometer reads the temperature detecting the infrared radiation emitted by the region of interest of the body whose temperature is to be known and it determines said temperature according to the detected infrared radiation intensity.

The object according to the present invention is usable, for example, in the sector of the medical devices and instruments normally used in clinical/hospital contexts. However, the thermometer is also usable in the veterinary field or to measure the temperature of objects (for example, food or drinks).

BACKGROUND

As is well known, there are several types of infrared thermometers that allow the detection of body temperature at a close distance from the body whose temperature needs to be known.

Some of these infrared thermometers are provided with an appropriate pointing device which enables the user to identify the suitable distance for detecting the temperature of the body to be measured.

Once the ideal position for measuring the temperature is reached, one or more infrared radiation sensors detect the infrared emission of a portion of one of the external surfaces of the body to be measured.

On the basis of this detection and of the ambient temperature, infrared thermometers can determine the temperature of the surface to be measured and/or calculate the real internal temperature of the body (for example by exploiting appropriate conversion tables or applying appropriate correctives starting from the measured external temperature of the subject and from the ambient temperature); the value of the measured temperature is shown on liquid crystal displays or to Led located on the corresponding casings or shells.

Although some known infrared thermometers allow for an easy detection of the temperature of the bodies to be measured without coming into contact therewith, the Applicant has detected that they are not free of some drawbacks and are improvable according to different aspects, mainly in relation to their correct positioning with respect to the bodies to be measured, to convenience in reading the measurements made, to the time necessary for reading the measurements made, as well as to the practicality in performing a series of measurements and of readings of the temperature in close sequence.

In particular, the Applicant has detected that the search for the ideal position for detecting the temperature (if provided) is not always simple and is not always intuitive.

To overcome this drawback, thermometers provided with optical, ultrasonic or electromagnetic wave systems for determining the correct distance have been realized, however, these systems impact the overall marketing costs of the instrument and are not always easy to use.

It should also be considered that known infrared thermometers allow reading the detected temperature through a dedicated display arranged externally on their casing. Consequently, the operation of detecting and reading the temperature of the bodies being measured requires at first the correct positioning of the thermometers with respect to the bodies being measured, pointing them suitably toward the bodies, then, once the measurement is taken, the appropriate orientation to be able to read the display and the temperature calculated on the basis of the respective measurements. The time required for this operation, which generally may vary between 2 and 4 seconds, is not negligible when, in clinical and hospital contexts, for example, or in airport checks, it is necessary to carry out a significant number of consecutive measurements and readings.

Moreover, in case of non-backlit display, the detection has to be read in a lighted environment; this creates some problems during night-time measurements. On the other hand, backlit displays consume energy and therefore require more frequent replacement of the batteries.

SUMMARY

The main purpose of the present invention is to propose an infrared thermometer able to solve one or more of the problems detected in the prior art.

An additional purpose of the present invention according to some claims is to propose an infrared thermometer that allows rapid and practical identification of the correct position for detecting the temperature and an immediate reading thereof.

Another purpose of the present invention is to propose an infrared thermometer that is convenient to use.

A further purpose of the present invention is to propose an infrared thermometer that allows a rapid reading of the detected temperature.

It is also a purpose of the present invention is to propose an infrared thermometer that has low construction and marketing costs.

These purposes and others besides, together with a series of advantages, are substantially obtained by an infrared thermometer, in accordance with what is described and expressed in the claims that follow.

BRIEF DESCRIPTION OF THE DRAWINGS

The description of embodiments of an infrared thermometer is now provided by way of example.

Such description will be made herein below with reference to the accompanying drawings, provided for indicative purposes only and therefore not limiting, wherein:

FIG. 1 is a plan view of an infrared thermometer, in accordance with a first embodiment;

FIG. 2 is a schematic view of the infrared thermometer represented during a step of detecting the body temperature of an infant inside an incubator;

FIG. 3 is a perspective view of the infrared thermometer, In accordance with a second embodiment;

FIG. 4 is an additional perspective view of the infrared thermometer of FIG. 3;

FIG. 5 is a lateral elevation view of the infrared thermometer, in accordance with a third embodiment, shown in closed condition;

FIG. 6 is a front elevation view of the infrared thermometer of FIG. 5, shown in open condition;

FIG. 7 is a lateral elevation view of the infrared thermometer of FIGS. 5 and 6, shown in the open phase;

FIG. 8 is a front elevation view of the infrared thermometer of FIGS. 5 to 7, shown in closed condition;

FIG. 9 is a perspective view of the infrared thermometer, in accordance with a fourth embodiment, shown in connection with an electronic device;

FIG. 10 is an additional perspective view of the infrared thermometer of FIG. 9;

FIG. 11 is a perspective view of the infrared thermometer, in accordance with a fifth embodiment, shown in connection with an electronic device;

FIG. 12 is a perspective view of the infrared thermometer of FIG. 11, disconnected from the electronic device;

FIG. 13 is an additional perspective view of the infrared thermometer of FIG. 12;

DETAILED DESCRIPTION

Figure 4A:
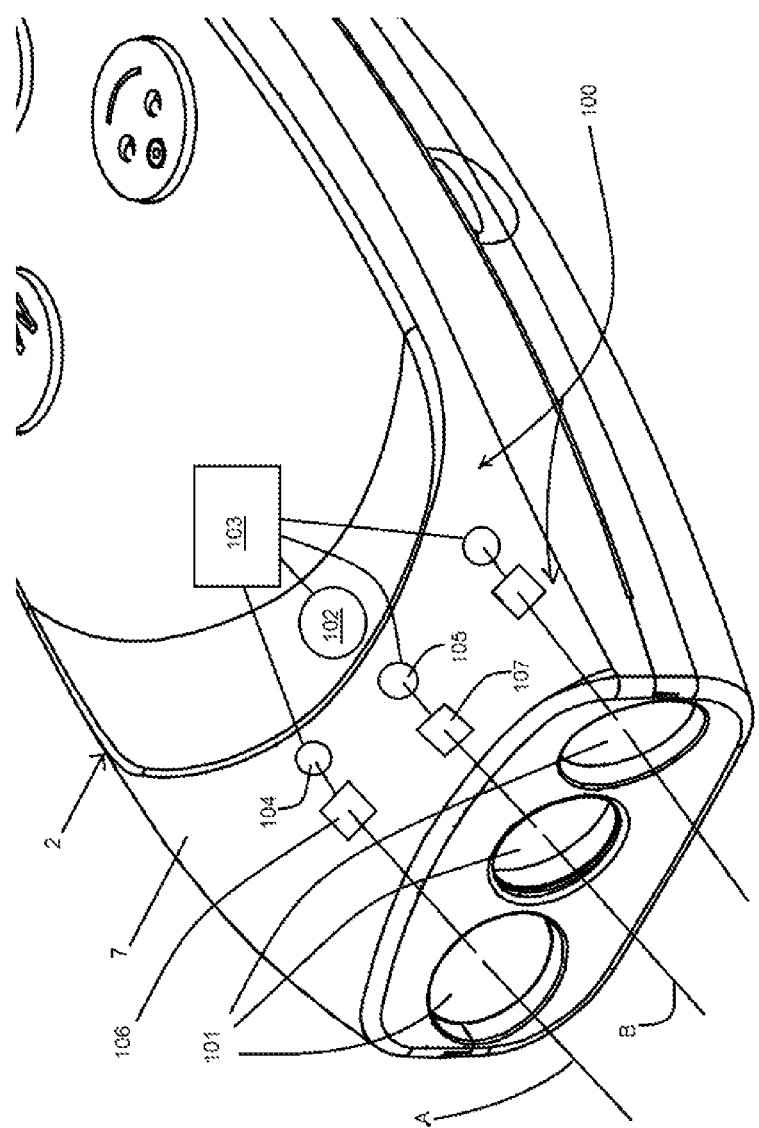
FIG. 4a is a schematic view of the pointing and detection portion of the infrared thermometer of FIG. 4.

With reference to the FIGS. 1 to 8 and 29-31, the numeral 1 designates an infrared thermometer in its entirety.

As is readily apparent in the embodiments shown in the FIGS. 1 to 8 and 29-32, the infrared thermometer 1 comprises a casing 2 provided with a control portion 3 whereat are arranged one or more pushbutton 4 for selecting different functions and/or for performing different operations.

At the side opposite to or below the control portion 3, the casing 2 has a grip portion 5, shaped in such a way as to facilitate the hand grip by a user for the operations of detecting and reading the temperature of a body 6 to be measured, which can be inanimate, such as an object, or living, for example the body of a human being (FIG. 2), or of an animal.

With reference to the FIGS. 1 to 7 and 29-32, the casing 2 is provided with a pointing and detection portion 7 that has to be oriented in the direction of the body 6 to be measured, so that it is possible to detect its temperature.

The infrared thermometer 1 also comprises at least one pointing device (100—FIG. 4a) operatively arranged in the pointing and detection portion 7 of the casing 2 to emit at least one light beam which can be the numerical representation of the temperature to be known (e.g. the internal temperature of a subject, or the temperature of an object).

In a preferred, but not exclusive embodiment, the pointing device emits two light beams whose projections define, on a respective destination surface 6a (FIG. 2) of the body 6 whose temperature is to be known, respective luminous shapes 8 (FIGS. 2 and from 14 to 28).

Advantageously, the pointing device is provided with an optical mechanism (101—FIG. 4a) able to generate the displacement of a luminous shape 8 with respect to the other (FIGS. 20 to 28) following the approach or the removal of the infrared thermometer 1 to/from the destination surface 6a of the body 6 to be measured, between a series of search positions (FIGS. 20, 21, 23, 24, 26 and 27) each relating to a distance that is not suitable for the correct detection of the temperature of the body 6 to be measured and at least one detection position (FIGS. 22, 25 and 28), indicative of an ideal distance for the detection of the temperature of the body to be measured.

In other words, by approaching or removing the thermometer from the body to be measured the relative position of the luminous shape is changed; the luminous shape is formed correctly only when the thermometer is at the correct distance. It should be noted that the two luminous shapes may, for example, consist of the numerical representation of the temperature (the second one—8b) and of a graphic representation (the first one —8a) which is aligned to the representation of the temperature when the thermometer is at the correct distance. The two light beams may also be the representation of a part (for example the upper half or the lower half) of the temperature which is formed into a legible number (with the half-parts perfectly aligned) only when the thermometer is at the right distance.

In an additional example, the two light rays instead are both partial graphic representations that originate a joined representation only when the thermometer is at the correct distance and the temperature constitutes a third light ray which may be independent of the others in the representation of the correct distance.

In an additional variant, the device can emit only one light beam representing the temperature, which is out of focus on the destination surface 6a until the temperature is at the correct distance in which the representation of the temperature is instead focused: in this way, the user can determine (at least approximately) the correct distance of the thermometer for detection of the temperature.

In yet an additional variant, the light beam projects only the temperature, leaving it to the user to determine the correct distance whereat the measurement is to be acquired.

Figure 22:
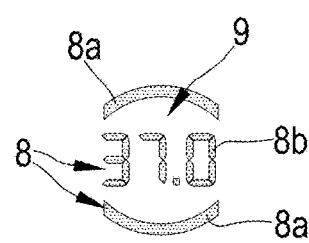
Figure 23:
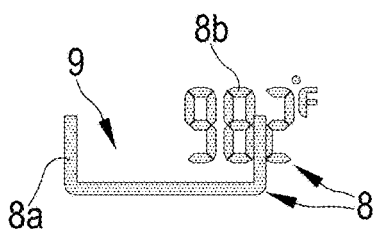
FIGS. 23 to 25 represent respectively two search positions and one detection position visible by means of the second alternative of the projection of the temperature detectable with the infrared thermometer.
Figure 24:
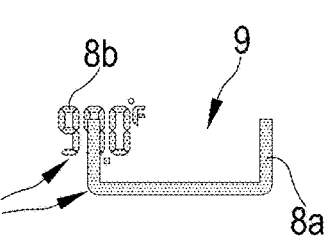
Figure 25:
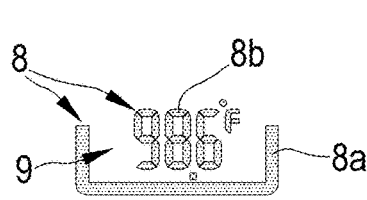
Figure 26:
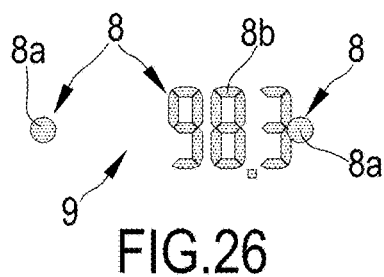
FIGS. 26 to 28 represent respectively two search positions and one detection position visible by means of the third alternative of the projection of the temperature detectable with the infrared thermometer.
Figure 27:
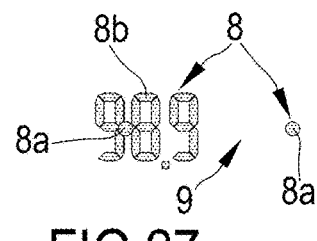
Figure 28:
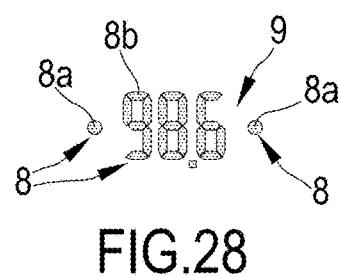

The infrared thermometer 1 further comprises at least one infrared device (102—FIG. 4a) for detecting the temperature, operatively arranged at the pointing and detection portion 7 of the casing 2 and configured to detect an infrared radiation coming from the destination surface 6a of the body 6 to be measured, specifically (but not necessarily only) when the luminous shapes 8 defined by the projection of the light beams on said destination surface 6 are in the detection position (FIGS. 22, 25 and 28).

The detection device optionally comprises a waveguide adapted to direct the infrared rays coming from the region of interest of the body on an infrared sensor.

Descending further into detail, the infrared thermometer 1 comprises at least one programmable electronic unit (103— FIG. 4a) positioned inside the casing 2 and connected at least to the infrared detection device to calculate the real or active temperature of the body as a function of the detected infrared radiation and of the ambient temperature.

In detail, since the detection device is able to measure the temperature of the body 6 at the destination surface 6a thereof, the programmable electronic unit calculates its real temperature on the basis of the temperature detected at the destination surface 6a, of the ambient temperature and of suitable predetermined coefficients.

Describing in further detail the structure and the operation of the infrared thermometer 1, at least one of the light beams emitted by the pointing device projects (FIGS. 2 and from 14 to 28) the temperature calculated by the programmable electronic unit on the destination surface 6a of the body 6 to be measured.

The thermometer always measures and project the temperature following activation, i.e. even when the distance is not the correct one. It is the operator who, releasing the activation pushbutton at the right time, determines the final measurement.

Obviously, it will also be possible for the projection of the temperature to be substantially prevented (for example by a control unit) until the thermometer is at the correct distance (or within a small interval around it).

In an additional embodiment, it is also possible for the temperature to be projected even when the distance is not the correct one, but the temperature value is locked (and stored) when the distance is the correct one for which the thermometer has been calibrated. In this case, the correct distance can be identified by optical triangulation, or ultrasound or capacitive or proximity system, or by other technique, and completion of the detection can be signaled by an optical system (for example, flashing of the projected value or of the reference shape 8a) or by an acoustic indication.

Advantageously, the optical mechanism of the pointing device is configured so that the luminous shapes 8 defined by the light beams emitted by the pointing device have, in the search positions (FIGS. 20, 21, 23, 24, 26 and 27), an offset detectable along at least one reference direction and, in the detection position (FIGS. 2, 22, 25 and 28), an alignment detectable along said reference direction.

In detail, it is preferable that a first light beam (A in FIG. 4a) emitted by the pointing device defines, on the destination surface 6a of the body 6 to be measured, a first luminous shape 8a delimiting a respective convergence area 9, while a second light beam (B in FIG. 4a) also emitted by the pointing device defines, on the same destination surface 6a of the body 6 to be measured, a second luminous shape 8b.

In detail, the pointing device comprises a first light emitter (104—FIG. 4a), preferably a LED, to emit the first light beam A and to define the first luminous shape 8a and a second light emitter (105—FIG. 1a), preferably a LED, to emit the second light beam B and to define the second luminous shape 8b.

The alignment of the first 8a and of the second luminous shape 8b, which corresponds to the detection position (FIGS. 2, 22, 25 and 28), of the infrared thermometer 1, is detectable when the second luminous shape 8b is within the convergence area 9 delimited by the first luminous shape 8a.

When the second luminous shape 8b is within the convergence area 9 (FIGS. 2, 22, 25 and 28) defined by the first luminous shape 8a, the second luminous shape 8b indicates the temperature of the body 6 calculated by the programmable electronic unit.

In detail, the optical mechanism of the pointing device comprises one or more lenses arranged at the pointing and detection portion 7 of the infrared thermometer 1. These lenses are configured so as to align the luminous shapes 8 in the detection position (FIGS. 2, 22, 25 and 28) when the infrared thermometer 1 is at the ideal distance for detection of the temperature of the body 6 to be measured.

Advantageously, at least one lens of the optical mechanism is of the biconvex type so that it is able to concentrate and focus the light coming from the pointing device at a predetermined distance.

According to an aspect, the infrared thermometer 1 comprises at least one shutter element (106—FIG. 4a) arranged at the pointing and detection portion 7 to give a predetermined shape to the first luminous shape 8a defined by the first light beam A emitted by the pointing device.

In detail, the shutter element 106 is positioned in the pointing and detection portion 7 of the casing 2 so as to remain interposed between the pointing device and the destination surface 6a of the body 6 to be measured.

The shutter element can comprise at least one plate (not shown) which has at least one through opening (not shown) having the shape to be given to the first luminous shape 8a projected on the destination surface 6a of the body 6 to be measured. The through opening of the plate of the shutter element is, at least partially, preferably completely, impacted by the first light beam emitted by the pointing device of the infrared thermometer so that the shape of the first luminous shape 8a is defined on the destination surface 6a of the body 6 to be measured. Alternatively to the plate, the shutter element may be defined, in the pointing and detection portion 7, by the structure of the casing 2 itself. In this case too, the shutter element has at least one through opening having the shape to be given to the first luminous shape 8a projected or to be projected on the destination surface 6a of the body 6 to be measured. Similarly to the operation of the shutter element provided with the plate, the shutter element that lacks the plate is impacted by the respective light beam to project the first luminous shape 8a on the destination surface 6a of the body 6.

Figure 17:
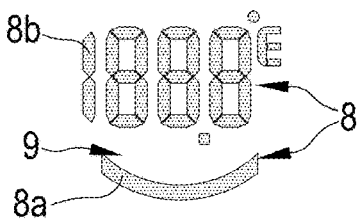
FIG. 17 is a fourth alternative of the projection of the temperature detectable by the infrared thermometer.

As shown in FIG. 17, the through opening of the shutter element has a shape that gives the form of a single arc to the first luminous shape. In this case, the convergence area 9 is at least partially delimited by said arc.

Figure 14:
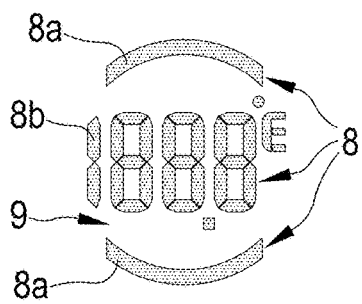
FIG. 14 is a first alternative of the projection of the temperature detectable by the infrared thermometer.

With reference instead to FIGS. 2, 14 and from 20 to 22, the through opening of the shutter element has a shape that gives the form of at least two arcs with opposite concavities to the first luminous shape 8a. According to this configuration, the convergence area 9 is at least in part delimited between said arcs.

Figure 15:
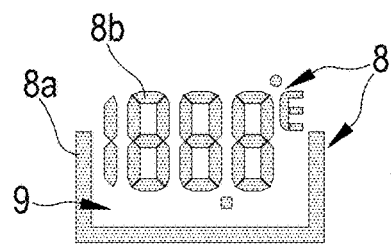
FIG. 15 is a second alternative of the projection of the temperature detectable by the infrared thermometer.

As shown in FIGS. 15 and from 23 to 25, the through opening of the shutter element has a shape that gives to the first luminous shape 8a the form of a polygonal chain that presents a central segment from whose ends extend perpendicularly two respective lateral segments to draw a semi-rectangle. In this case, the convergence area is at least partly delimited inside the segments of the polygonal chain.

Figure 18:
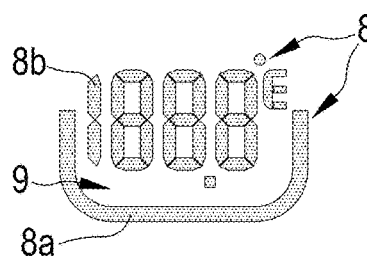
FIG. 18 is a fifth alternative of the projection of the temperature detectable by the infrared thermometer.

As shown in FIG. 18, the through opening of the shutter element has a shape that gives the form of a laid-down "C" to the first luminous shape 8a. In this case, the convergence area 9 is delimited at least in part by the laid-down "C" luminous shape 8a.

Figure 16:
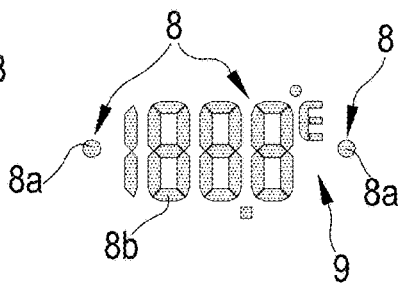
FIG. 16 is a third alternative of the projection of the temperature detectable by the infrared thermometer.

As shown in FIGS. 16 and from 26 to 28, the through opening of the shutter element has a shape that gives the form of two mutually distanced points to the first luminous shape 8a. The convergence area 9 is at least partly delimited between said points.

Figure 19:
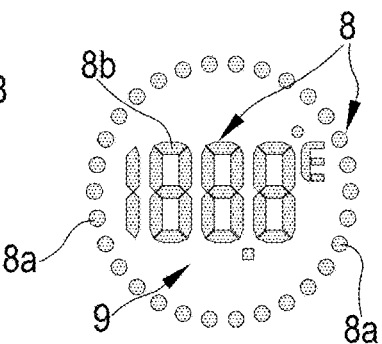
FIG. 19 is a sixth alternative of the projection of the temperature detectable by the infrared thermometer.
Figure 20:
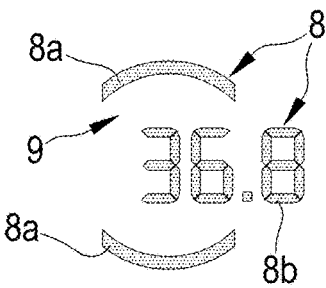
FIGS. 20 to 22 represent respectively two search positions and one detection position visible by means of the first alternative of the projection of the temperature detectable with the infrared thermometer.
Figure 21:
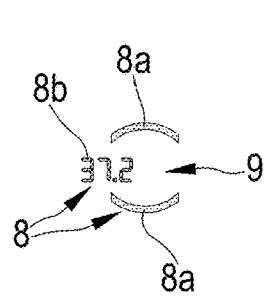

Alternatively, as shown in FIG. 19, the through opening of the shutter element has a shape that gives to the first luminous shape 8a the form of a circle, preferably defined by a plurality of distributed points, optionally equidistant on a respective circumference. In this case, the convergence area is at least partly delimited by said circle or by the plurality of points. It should be noted that both a circumference originated by a series of point and a complete circle is possible, for example acting on the lens to distribute light in such a way as to fill the holes present in the shutter.

Advantageously, the infrared thermometer 1 further comprises at least one negative display (107—FIG. 4a) arranged in the pointing and detection portion 7 of the casing 2 so as to remain interposed between the pointing device and the destination surface 6a of the body 6 to be measured so as to be impacted, at least partially, preferably completely by the second light beam B emitted by the pointing device which is tasked with defining the second luminous shape 8b.

In particular, the negative display gives a variable form to the second luminous shape 8b defined by the second light ray emitted by the pointing device.

Advantageously, in an embodiment, the form of the second luminous shape 8b corresponds to a predetermined symbol, for example a plurality of dots, indicative of the search positions, i.e. of the positions of non-detection of the temperature, and corresponding to the temperature of the body 6 to be measured calculated by the programmable electronic unit.

The change of the form of the second luminous shape 8b is managed automatically by the programmable electronic unit which intervenes on the negative display to project on the destination surface 6a of the body 6 to be measured the aforementioned symbol or the calculated temperature. Alternatively, as mentioned, the thermometer (once activated) always projects the temperature and it is the user who establishes when to make the detection on the patient (for example exploiting the system for pointing and determining the correct distance).

Descending further in detail, the infrared temperature detection device comprises at least one infrared ray sensor configured to detect the electromagnetic radiation emitted by the destination surface 6a of the body 6 to be measured included in the infrared frequency band.

In addition, the infrared detection device comprises at least one waveguide, arranged at the pointing and detection portion 7 so as to be interposed between the detection device and the destination surface 6a of the body 6 to be measured.

The waveguide conveys the electromagnetic waves emitted by the destination surface 6a of the body 6 to be measured towards the infrared sensor so that it can carry out a correct measurement of the temperature of the body 6 on the destination surface.

In accordance with an additional embodiment, the pointing device is configured in such a way as to use the negative display to project on an inner surface of the casing 2 of the infrared thermometer 1, the temperature of the body 6 to be measured, calculated by the programmable electronic unit (see FIGS. 29-32).

Figure 32:
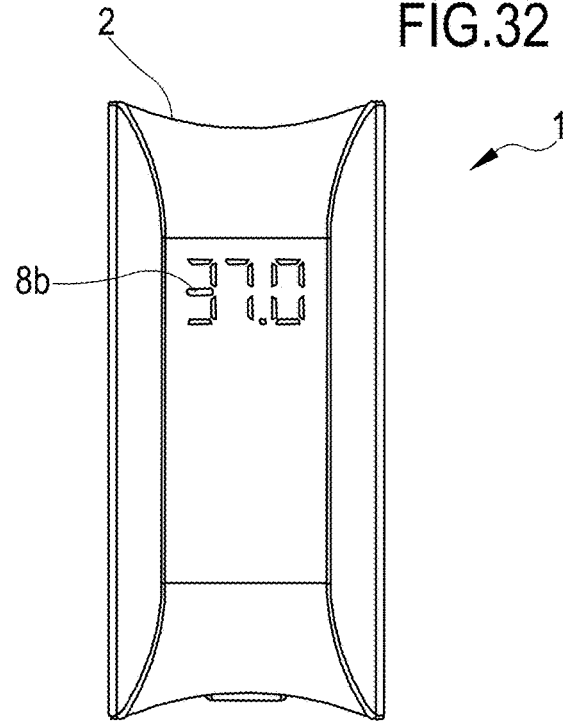

In this case, the portion of the casing 2 corresponding to the internal surface on which the temperature is projected is configured and constructed in such a way as to allow the traversing of the respective light beam and thereby enable the temperature of the body 6 to be measured to be displayed from the outside (FIG. 32).

In particular, the portion of casing 2 corresponding to the inner surface on which the temperature is projected the temperature is partially transparent (translucent) or opalescent.

In one example, the portion of casing 2 corresponding to the inner surface on which the temperature is projected is thin, preferably having a thickness between 0.5 millimeters and 0.8 millimeters and in particular it is made of plastic such as polycarbonate, ABS, nylon, polypropylene, etc. (semi-transparence can be given by the low thickness, or by the characteristics of the material, for example opalescent material).

To project the temperature of the body 6 to be measured inside the casing 2 of the infrared thermometer 1, the pointing device may or may not comprise an auxiliary light emitter, preferably a LED, configured to emit an auxiliary light beam towards the negative display and to project on the inner surface of the casing 2 the temperature calculated by the programmable electronic unit. In fact, even in the position with the apparatus closed, the same LED can illuminate the negative display to generate the projection inside the casing (see FIGS. 30 and 32).

In accordance with one aspect, the negative display is a liquid crystal display whose blackened (not lighted) pixels do not allow the passage of light, while the activated pixels allow light to transit through their screen.

In accordance with another embodiment solution illustrated in FIGS. 1, 3, 4 and 6, the infrared thermometer 1 comprises at least one auxiliary display 10 for an additional display of the temperature of the body 6 to be measured, calculated by the programmable electronic unit. The auxiliary display 10 is engaged with the casing 2 of the infrared thermometer 1 so as to be immediately viewable from the exterior.

Advantageously, the auxiliary display 10 is a liquid crystal display, preferably, but not necessarily, backlit.

Alternatively, the auxiliary display 10 can provide a LED display.

Alternatively to the external position of the auxiliary display 10 it is possible to position the auxiliary display inside the casing 2 in proximity or in direct contact with an inner surface thereof configured in such a way as to allow external viewing of the temperature of the body to be measured, calculated by the programmable electronic unit.

In this case, too, similarly to the configuration provided for the inner projection of the temperature by the pointing device, the portion of the casing 2 relating to the inner surface corresponding to the auxiliary 10 is at least in part semi-transparent or opalescent, or otherwise has very small thickness.

In detail, this portion of the casing 2 has sufficient thickness to allow the passage of light from the interior to the exterior of the casing 2.

Indicatively, the thickness provided to allow the light of the auxiliary display 11 to traverse the casing 2 is between 0.5 millimeters and 0.8 millimeters.

It should be noted that the presence of the display 10 can be optional because the temperature is generally projected. For example, the device of FIGS. 3 and 4 can lack said display in order to reduce and optimize costs. In accordance with one aspect, the infrared thermometer 1 and, therefore, the programmable electronic unit are configured so as to maintain the projection of the temperature of the body 6 to be measured for a period of time that is sufficient for it to be displayed and read. Advantageously, the projection of the temperature of the body 6 to be measured calculated by the programmable electronic unit is maintained for a period of time between 2 and 30 seconds, preferably between 5 and 20 seconds, still more preferably corresponding to approximately 10 seconds.

Figure 29:
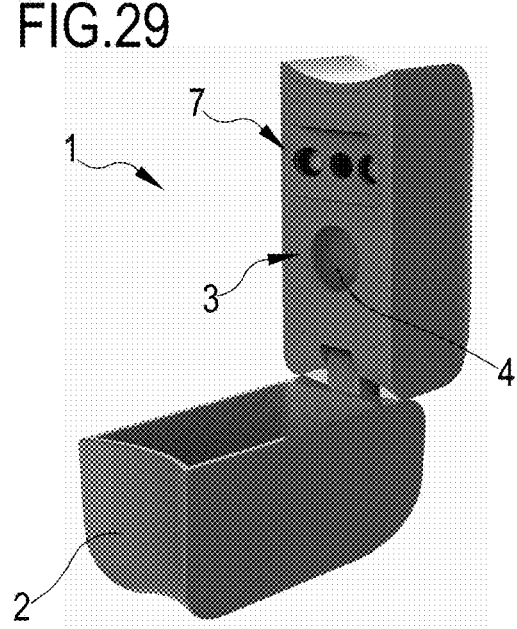
FIGS. 29-32 represent an additional embodiment of an infrared thermometer.
Figure 30:
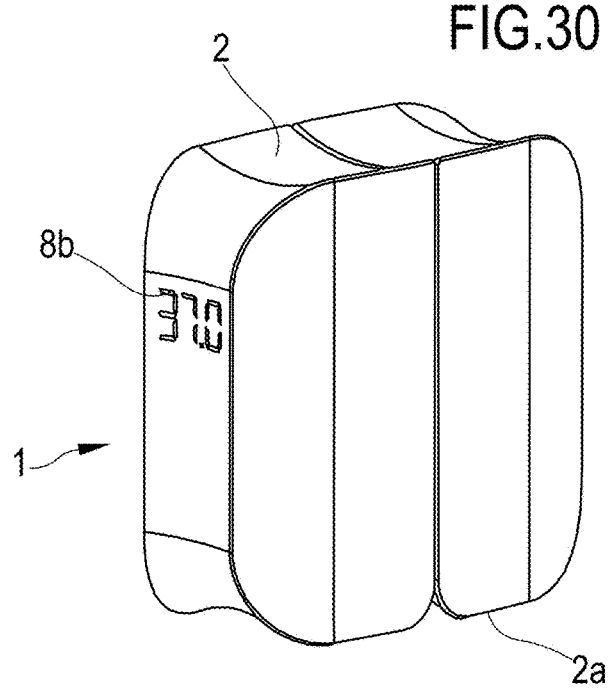
Figure 31:
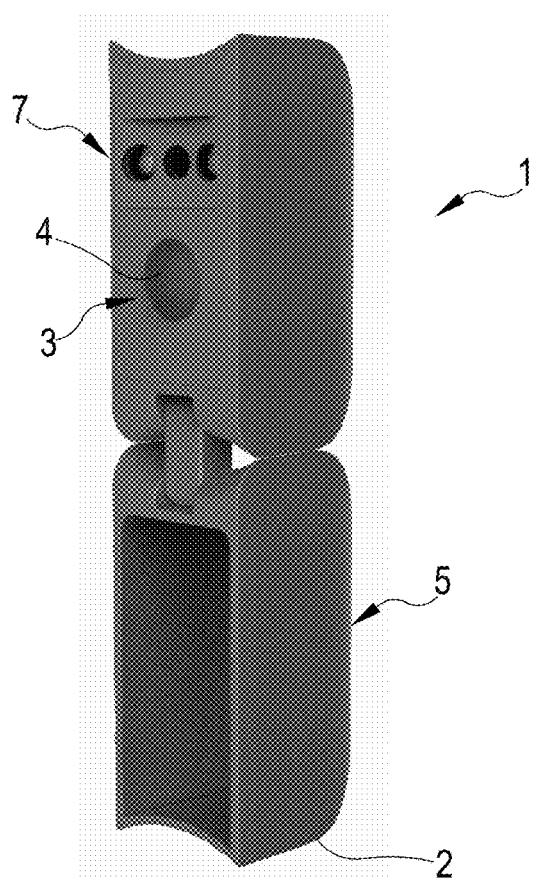

In accordance with an additional embodiment, shown in the FIGS. 5 to 8 and 29-32, the casing 2 of the infrared thermometer 1 can be folded between a closed condition (FIG. 8; FIGS. 30, 32) in which the pointing and detection portion 7 and the control portion 3 are enclosed by the casing itself and an open condition (FIGS. 5 to 7; FIGS. 29, 31) in which the pointing and detection portion 7 and the control portion are not enclosed by the casing 2 being therefore accessible from the exterior.

As shown in FIGS. 7 and 8 and 29, 31, when the casing 2 is in the open condition it can present a substantially pistol-like conformation with an ergonomic grip portion 5 to facilitate the grip by a user.

With reference instead to FIGS. 8 and 30, the casing 2 advantageously has a support surface 2a sufficiently large for the infrared thermometer 1 to be able to remain in an erect and stable position when it is in the closed condition.

In addition, the infrared thermometer 1 is configured so as to maintain in projection the temperature of the body 6 to be measured calculated by the programmable electronic unit when the casing 2 is switched from the open condition (FIGS. 5 and 6; 29) to the closed condition (FIGS. 8; 32). In this situation, the programmable electronic unit perceives, by means of at least one sensor or a similar detector, the closing of the casing 2 which determines the projection of the temperature on an inner surface of the casing 2.

To allow a correct reading of the calculated temperature from the exterior, when the programmable electronic unit perceives the closing of the casing 2, acts on the negative display so as to turn upside down the projection of the temperature on the inner surface of the closed casing 2 so that the temperature can easily be read from the exterior.

Naturally, to allow light to pass through the casing 2, the portion dedicated to the projection of the temperature must have the same structure characteristics of transparency and/or thickness mentioned above in relation to the other embodiments.

In an additional improvement, in particular, though not exclusively, of what is shown in FIGS. 29-32, the device 1 may also provide the projection of the ambient temperature. In an additional variant, the device may be able to project the time as well. In other words, when the thermometer is not in use, it can be transformed into a clock representing on the outer casing the time and/or the date and/or the ambient temperature, which may alternate.

In an additional variant, the apparatus can also be only a clock that projects the image from the interior on the outer casing.

The infrared thermometer further comprises a source of electric power supply (not shown), preferably one or more batteries, still more preferably, but not necessarily, rechargeable batteries.

In accordance with the embodiments shown in FIGS. 9 to 13, the infrared thermometer 1 is a simplified version of the embodiments described above, which operate in association with an electronic device 11, for example a smartphone, a tablet, a computer and/or similar devices provided with a programmable electronic unit and with a software or with an application dedicated to the management of the infrared thermometer 1.

In detail, the infrared thermometer 1 represented in the FIGS. 9 to 13 comprises a casing 2 provided with a pointing and detection portion 7.

In this case, the infrared thermometer 1 comprises a pointing device operatively arranged in the pointing and detection portion 7 of the casing 2 to emit at least one light beam whose project defines, on a respective destination surface 6a of a body 6 whose temperature is to be known, at least one luminous shape (preferably but not necessarily consisting of the detected temperature).

As described previously, it will be possible to have at least two light beams to generate at least two respective luminous shapes 8a. The pointing device is also provided with an optical mechanism able to determine the displacement of one luminous shape with respect to the other as a result of the approach or of the removal of the thermometer to/from the destination surface 6a of the body 6 to be measured between a series of search positions each relating to an unsuitable distance for the correct detection of the temperature of the body 6 to be measured and at least one detection position that is indicative of an ideal distance for the detection of the temperature of the body 6 to be measured.

The thermometer also comprises an infrared device for detecting the temperature, operatively arranged at the pointing and detection portion 7 of the casing 2.

The infrared detection device is configured to detect the temperature of the destination surface 6a of the body 6 in particular (but not exclusively) when the shapes 8 defined by the projection of the light beams on said destination surface 6a are in the detection position.

Advantageously, the infrared thermometer comprises at least one connection interface 12 for connection to an electronic device 11 provided with at least one programmable electronic unit configured (for example by means of an appropriate downloadable and installable app) to calculate the real temperature of the body to be measured on the basis of the temperature detected at the destination surface 6a thereof, of the ambient temperature and of suitable predetermined coefficients relating to the type of body to be measured. Alternatively, the temperature is calculated by the infrared detection device itself, while the electronic device 11 (such as the smartphone) is used as a source of energy, to display the temperature and possibly other information and to transmit info for example to the medical file by means of Bluetooth or wireless.

In this case, too, at least one of the light beams emitted by the pointing device projects on the destination surface 6a of the body 6 to be measured the temperature calculated by the programmable electronic unit of the electronic device 11 or by the thermometer 11 when the shapes 8 defined on the destination surface 6a of the body 6 by the respective light beams are in the detection position.

In accordance with an embodiment variant of the infrared thermometer 1 able to be associated to the electronic management and power supply devices, the optical mechanism of the pointing device is configured so that the luminous shapes 8 defined by the light beams emitted by the pointing device have, in the search positions, an offset (FIGS. 20, 21, 23, 24, 26 and 27) detectable along at least one reference direction and, in the detection position, an alignment (FIGS. 2, from 14 to 19, 22, 25 and 28) detectable along said reference direction.

Similarly to the other embodiments described above, a first light beam emitted by the pointing device defines, on the destination surface 6a of the body 6 to be measured, a first luminous shape 8a which delimits a respective convergence area 9, while a second light beam emitted by the pointing device defines, on the destination surface 6a of the body 6 to be measured, a second luminous shape 8b. The alignment of the first 8a and of the second luminous shape 8b, corresponding to the detection position of the infrared thermometer 1, is detectable when the second luminous shape 8b is within the convergence area 9 delimited by the first luminous shape 8a. In this situation, the second luminous shape 8b indicates the temperature of the body 6 calculated by the programmable electronic unit.

In this case, too, the optical mechanism of the pointing device comprises one or more lenses arranged at the pointing and detection portion 7 of the infrared thermometer 1. These lenses are configured so as to align the luminous shapes 8a, 8b in the detection position when the infrared thermometer 1 is at the ideal distance for detection of the temperature of the body 6 to be measured.

The infrared thermometer 1 comprises, for the embodiments described above, a shutter element arranged at the pointing and detection portion to give to the first luminous shape 8a defined by the first light beam emitted by the pointing device a predetermined shape, for example those shown in the FIGS. 2 and from 14 to 28.

In accordance with an alternative embodiment of the infrared thermometer 1 that can be associated to an electronic device 11 for managing and supplying power to the optical mechanism of the pointing device is configured so that at least two luminous shapes defined by the light beams emitted by the pointing device diverge or are distanced from each other, in the search positions, and converge or coincide, in the detection position. In this situation, a first light beam emitted by the pointing device defines, on the destination surface 6a of the body 6 to be measured, at least two first luminous shapes, while a second light beam emitted by the pointing device defines, on the destination surface 6a of the body 6 to be measured, a second luminous shape.

The convergence or coincidence of the first luminous shapes corresponding to the position of detection of the infrared thermometer 1 indicates the correct distance for the detection and the calculation of the real temperature of the body 6 that is displayed by means of the second luminous shape.

The infrared thermometer 1 able to be associated with a management and power supply electronic device 11, lastly, comprises a series of components already provided in the embodiments described above, for example the negative display, the infrared sensor, the waveguide.

Since such versions of infrared thermometers are particularly simplified to be used in association with other electronic management and power supply devices 11, they do not provide any auxiliary display for viewing the calculated temperatures.

Moreover, these simplified infrared thermometers can also lack power supply systems because they are supplied power by the electronic device 11 to which they are associated and they can lack electronic programmable electronic units, since they are already provided in the aforementioned electronic devices 11.

What is claimed is:

1. An infrared thermometer comprising:
   a casing having a control portion, a grip portion and a pointing and detection portion;
   at least one pointing device arranged in the pointing and detection portion of the casing, the pointing device including:
      a first and a second light emitter of at least a first and a second light beams towards a destination surface of the body to be measured,
      at least one shutter element positioned relative to the emitter so as to be impacted by the first light beam emitted by the first light emitter, wherein the shutter element comprises at least one plate presenting at least one through opening having a shape configured for forming a first luminous shape on said destination surface,
      at least one negative display positioned relative to the emitter so as to be impacted by the second light beam emitted by the emitter, wherein the negative display is configured to confer to the second light beam a second luminous shape of a variable form,
      an optical mechanism configured to cause a displacement of one of said first and second luminous shapes with respect to the other, as a result of a thermometer displacement relative to said destination surface, between a series of search positions relating to unsuitable distances of the infrared thermometer from said detection surface for the correct detection of the temperature of the body to be measured by the infrared thermometer and at least one detection position indicative of an ideal distance of the infrared thermometer from said detection surface for the detection of the temperature of the body to be measured by the infrared thermometer;
   at least one infrared temperature detector at the pointing and detection portion of the casing, the infrared temperature detector being configured to detect the temperature of said destination surface at least when the first and second luminous shapes are in the detection position;
   at least one programmable electronic unit arranged inside the casing and connected to at least the infrared temperature detector and to the pointing device, the programmable electronic unit being programmed to:
      calculate a real temperature of the body when the first and second luminous shapes defined on said destination surface are in the search position corresponding to the detection position of the infrared thermometer, wherein the calculation of the real temperature of the body is made on the basis of the temperature detected at the destination surface, of an ambient temperature and of predetermined coefficients relating to a type of destination surface to be measured;
      control the negative display to form of the second luminous shape corresponding to the temperature of the body calculated by the programmable electronic unit, when the infrared thermometer is in the detection position;
   wherein the pointing device is configured to project on an inner surface of the casing, by means of the negative display, the temperature of the body to be measured, calculated by the programmable electronic unit, and wherein the casing portion corresponding to the inner surface on which the temperature is projected is at least in part transparent or semitransparent or opalescent and allows the traversing of the respective light beam and a reading from the exterior.

2. The infrared thermometer according to claim 1, wherein the optical mechanism of the pointing device is configured so that the first and the second luminous shape defined by the first and the second light beams emitted by first and a second light emitter of the pointing device have, in the search positions, an offset detectable along at least one reference direction and, in the detection position, an alignment detectable along said reference direction;
   wherein:
      the first light beam emitted by the first light emitter of the pointing device defines, on the destination surface of the body to be measured, the first luminous shape delimiting a respective convergence area;
      the second light beam emitted by the second light emitter of the pointing device defines, on the destination surface of the body to be measured, the second luminous shape;
      wherein the alignment of the first and of the second luminous shape corresponding to the detection position of the infrared thermometer is detectable when the second luminous shape is inside the convergence area delimited by the first luminous shape, the second luminous shape indicating the temperature of the body calculated by the programmable electronic unit at least when the second luminous shape is inside the convergence area defined by the first luminous shape.

3. The infrared thermometer according to claim 2, wherein the shutter element is defined, in the pointing and detection portion, by a structure of the casing, the shutter having at least one through opening having the shape to be given to the first light beam to define the first luminous shape on the destination surface of the body to be measured, the through opening of the shutter element being impacted by the first light beam emitted by the first light emitter of the pointing device.

4. The infrared thermometer as claimed in claim 3, wherein the through opening of the shutter element has a shape that gives to the first luminous shape a form selected among: the form of a single arc, the convergence area being at least partially delimited by said arc; the form of at least two arcs with opposite concavities, the convergence area being at least partly delimited between said arcs; the form of a polygonal chain having a central segment from whose ends two respective lateral segments extend perpendicularly, the convergence area being at least partly delimited by said polygonal chain; the form of a laid-down "C", the convergence area being delimited at least in part by the laid-down "C" shape; the form of two points distanced from each other, the converge area being delimited at least in part between said points; the form of a circle, defined by a plurality of distributed points, the convergence area being at least partly delimited by the circle or by the plurality of points; and the form of a circle, defined by a continuous or substantially continuous line, the convergence area being at least in part delimited by the continuous circle.

5. The infrared thermometer according to claim 1, wherein the optical mechanism of the pointing device comprises one or more lenses arranged at the pointing and detection portion, the lenses being configured so as to align the first and second luminous shapes in the detection position when the infrared thermometer is at the ideal distance for the detection of the temperature of the body to be measured, and wherein at least one lens of the optical mechanism is a biconvex lens able to concentrate and focus light at a predetermined distance.

6. The infrared thermometer according to claim 1, wherein the shutter element is positioned in the pointing and detection portion of the casing and is interposed between the first light emitter and the destination surface of the body to be measured.

7. The infrared thermometer according to claim 1, wherein a casing portion corresponding to the inner surface on which the temperature is projected is thin, having a thickness between 0.5 millimeters and 1 millimeter, to allow at least the partial passage of the second light beam emitted by the second light emitter of the pointing device.

8. The infrared thermometer according to claim 1, wherein the infrared temperature detector comprises:
 a sensor of infrared rays configured to detect the electromagnetic radiation emitted by the destination surface of the body to be measured, included in the infrared frequency band;
 a waveguide arranged at the pointing and detection portion and interposed between the infrared temperature detector and the destination surface of the body to be measured, the waveguide conveying electromagnetic waves emitted by the destination surface of the body to be measured towards the sensor of infrared rays.

9. The infrared thermometer according to claim 1, wherein the pointing device comprises:
 a first LED light emitter, for emitting the first light beam and defining the first luminous shape;
 a second LED light emitter, for emitting the second light beam and defining the second luminous shape.

10. The infrared thermometer according to claim 1, wherein the pointing device comprises an auxiliary LED light, for emitting an auxiliary light beam towards the negative display and projecting on the inner surface of the casing the temperature calculated by the programmable electronic unit.

11. The infrared thermometer according to claim 1, further comprising at least one auxiliary display for an additional viewing of the temperature of the body to be measured calculated by the programmable electronic unit, the auxiliary display being a liquid crystal display.

12. The infrared thermometer according to claim 11, wherein the auxiliary display is arranged inside the casing in proximity or in contact with an inner surface thereof and is configured to allow the viewing of the temperature calculated by the programmable electronic unit from the exterior of the body to be measured, wherein the casing portion relating to the inner surface corresponding to the auxiliary display is at least partly transparent or semitransparent or opalescent.

13. The infrared thermometer according to claim 12, wherein a casing portion at the inner surface corresponding to the auxiliary display is thin, having thickness of between 0.5 millimeters and 0.8 millimeters, to allow the exterior viewing of the temperature of the body to be measured, as calculated by the programmable electronic unit.

14. The infrared thermometer according to claim 13, wherein the auxiliary display of the thermometer is configured to project the current time or the time interval necessary for the stabilization of the thermometer on the inner surface.

15. The infrared thermometer according to claim 1, wherein the casing is foldable between a closed condition in which the pointing and detection portion and the control portion are enclosed by the casing itself in an inner cavity and an open condition, in which the pointing and detection portion and the control portion are not enclosed, being therefore accessible from the exterior; wherein, in the open condition, the casing has a substantially pistol-like conformation with an ergonomic grip portion to facilitate a user's grip, and in the closed condition, the casing has a support surface to maintain the thermometer in an erect position.

16. The infrared thermometer according to claim 15, wherein the infrared thermometer is configured so as to project, in the closed condition, the temperature of the body measured previously, calculated by the programmable electronic unit, said projection being carried out on an inner surface of the inner cavity, the programmable electronic unit being provided with a sensor to detect the closing of the casing to turn upside down the projection of the temperature on the inner surface of the closed casing so that it is legible from the exterior.

17. The infrared thermometer according to claim 1, further comprising at least one display arranged in the pointing and detection portion of the casing wherein temperature digits represent the temperature and become dark not allowing light to pass, a light beam traversing all other digits, not being the temperature digits, to project a luminous shape within which the projected temperature is not luminous.

18. An infrared thermometer comprising:
a casing provided with a pointing and detection portion;
at least one pointing device arranged in the pointing and detection portion of the casing, the pointing device including:
a first and second emitter of at least a first and second light beam towards a destination surface of the body to be measured
at least one shutter element positioned relative to the emitter so as to be impacted by the first light beam emitted by the first light emitter, wherein the shutter element comprises at least one plate presenting at least one through opening having a shape configured for forming a first luminous shape on said destination surface,
at least one negative display positioned relative to the emitter so as to be impacted by the second light beam emitted by the emitter, wherein the negative display is configured to confer to the second light beam a second luminous shape of a variable form,
an optical mechanism configured to determine a displacement of one of said first and second luminous shapes with respect to the other, as a result of a thermometer displacement relative to the destination surface, between a series of search positions, relating to an unsuitable distances of the infrared thermometer from said detection surface for the correct determination of the temperature of the body to be measured by the infrared thermometer and at least one detection position indicative of an ideal distance of the infrared thermometer from said detection surface for the determination of the temperature of the body to be measured by the infrared thermometer;
at least one infrared temperature detector at the pointing and detection portion of the casing, the infrared temperature detector being configured to receive infrared radiation originating from the destination surface of the body and to determine the temperature of the body, wherein the pointing device is configured to project at least one of a graphical or textual depiction of the determined temperature of the body onto the destination surface at least when the first and second luminous shapes are in the detection position;
at least one interface for connecting to an electronic device;
at least one programmable electronic unit configured to:
calculate a corrected temperature of the body when the first and second luminous shapes defined on the destination surface are in the detection position, wherein the calculation of the corrected temperature of the body is made on the basis of a temperature measured at the destination surface thereof, of an ambient temperature and of predetermined coefficients relating to a type of the destination surface to be measured;
an electronic device separate from the casing and removably couplable to the casing by means of the connection interface;
wherein the programmable electronic unit is a part of the electronic device, or it is contained in the casing.

19. The infrared thermometer according to claim 18, wherein the separate electronic device is a cellular telephone and comprises a software module to interface with the casing provided with the pointing and detection portion and configured to manage the first and second emitters to emit the first and second light beams.

20. An infrared thermometer comprising:
a casing having a control portion, a grip portion and a pointing and detection portion;
at least one pointing device arranged in the pointing and detection portion of the casing, the pointing device including:
a first and a second light emitter of at least a first and a second light beam towards a destination surface of the body to be measured,
at least one shutter element positioned relative to the emitter so as to be impacted by the first light beam emitted by the first light emitter, wherein the shutter element comprises at least one plate presenting at least one through opening having a shape configured for forming a first luminous shape on said destination surface,
at least one negative display positioned relative to the emitter so as to be impacted by the second light beam emitted by the emitter, wherein the negative display is configured to confer to the second light beam a second luminous shape of a variable form,
an optical mechanism configured to cause a displacement of one of said first and second luminous shapes with respect to the other, as a result of a thermometer displacement relative to said destination surface, between a series of search positions relating to unsuitable distances of the infrared thermometer from said detection surface for the correct detection of the temperature of the body to be measured by the infrared thermometer and at least one detection position indicative of an ideal distance of the infrared thermometer from said detection surface for the detection of the temperature of the body to be measured by the infrared thermometer;
at least one infrared temperature detector at the pointing and detection portion of the casing, the infrared temperature detector being configured to detect the temperature of said destination surface at least when the first and second luminous shapes are in the detection position;
at least one display arranged in the pointing and detection portion of the casing wherein temperature digits represent the temperature and become dark not allowing light to pass, a light beam traversing all other digits, not being the temperature digits, to project a luminous shape within which the projected temperature is not luminous; and
at least one programmable electronic unit arranged inside the casing and connected to at least the infrared temperature detector and to the pointing device, the programmable electronic unit being programmed to:
calculate a real temperature of the body when the first and second luminous shapes defined on said destination surface are in the search position corresponding to the detection position of the infrared thermometer, wherein the calculation of the real temperature of the body is made on the basis of the temperature detected at the destination surface, of an ambient temperature and of predetermined coefficients relating to a type of destination surface to be measured;
control the negative display to form of the second luminous shape corresponding to the temperature of the body calculated by the programmable electronic unit, when the infrared thermometer is in the detection position.

* * * * *